Feb. 12, 1935. H. H. HILDEBRANDT 1,990,693
FISH LURE
Filed May 17, 1932

Inventor
Hiram H. Hildebrandt
By
Eccleston & Eccleston
Attorneys

Patented Feb. 12, 1935

1,990,693

UNITED STATES PATENT OFFICE 1,990,693

FISH LURE

Hiram H. Hildebrandt, Logansport, Ind.

Application May 17, 1932, Serial No. 611,904

3 Claims. (Cl. 43—42)

This invention relates to fish hooks of the type employing spoons and has for its primary object to combine with a hook of this type one or more spinners or bangles slidably and rotatably mounted on the shank of the hook so as to provide additional means for attracting fish and at the same time serving to conceal the hook proper.

A further object of the invention resides in the provision of a bearing member slidably mounted on the shank of the hook which not only serves as a bearing for the spinners but also provides an abutment which prevents the bangles from becoming interlocked with the barb of the hook.

Figure 1:
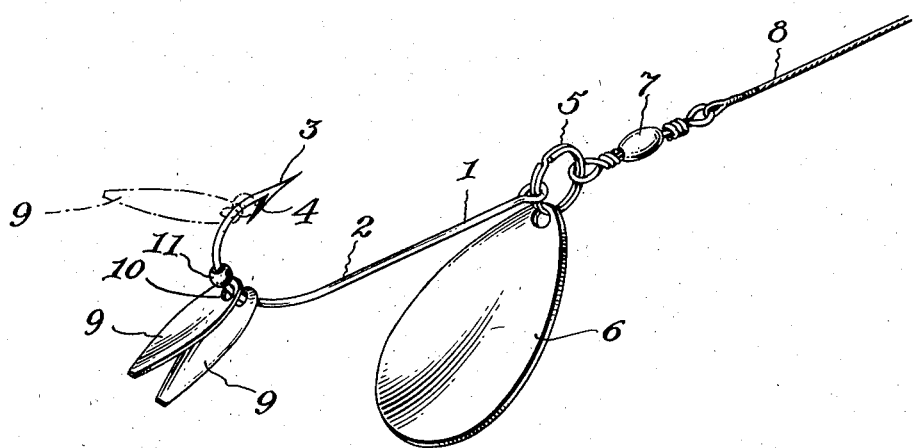

Other objects and advantages of the invention will become apparent to those skilled in the art from the following description when taken in connection with the accompanying drawing, in which, Figure 1 is a perspective view of the device.

Figure 2:
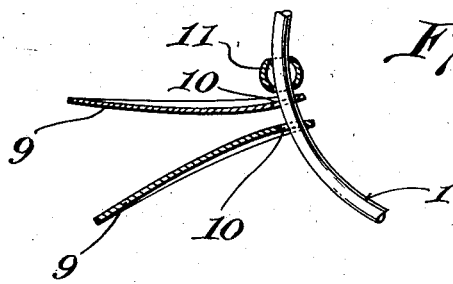
Figure 3:
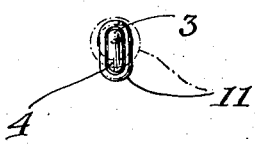

Figure 2 is a sectional view through the supplemental bangles, the hook being shown broken away and in elevation, and Figure 3 is an end view of the hook showing the manner of applying a bead thereto.

Referring to the drawing in greater detail the numeral 1 indicates a conventional fish hook provided with a shank portion 2, a prong 3 and barb 4. The eye of the hook is engaged by a split ring 5 which also carries a trolling spoon 6. The numeral 7 indicates the ordinary swivel connection between the ring 5 and line 8.

One or more bangles 9 provided with apertures 10 are threaded onto the fish hook 1 and are located in the position shown in full lines when the hook is in use. These bangles may be of any material, such as, metal, celluloid, etc., and any size desired, but are preferably substantially smaller than the conventional spoon 6, which is mounted adjacent the eye of the fish hook.

The bangles 9 are caused to flutter as the hook is drawn through the water and not only aid in supporting the prong end of the hook, but also to create a commotion to attract the fish. In this action of the bangles 9 there is a liability that they may become interlocked with the barb 4 of the hook proper, and in order to eliminate this possibility a bead 11 is provided. This bead is originally in oval form as indicated in Figure 3, so that it may be threaded over the barb of the hook, and is thereafter pressed to circular form as shown in Figures 1 and 2 and thus locks the bangles on the hook. The bead 11 serves to space the bangles from the barb 4 as indicated in dotted lines in Figure 1 and also acts as a bearing member for the bangles.

From the above description and attached drawing it will be apparent that I have devised a very simple and inexpensive improvement in the construction of fishing tackle; that means are provided for increasing the fish-catching qualities of the hook; and that a safeguard against entanglement of the moving parts is also provided.

What I claim is:

1. A combination of a fish hook and one or more bangles having openings, said bangles being slidably and rotatably mounted upon the shank of the hook, the openings being of sufficient diameter to permit free motion in various directions, and a collar slidably and rotatably mounted on the shank in advance of the bangles and at the rear of the barb of the hook and of sufficient width to prevent the bangles from engaging any portion of the barb whereby the bangles will at all times be freely swingable and slidable on the shank of the hook.

2. A combination of a fish hook, a spoon mounted adjacent one end of the shank of the hook, one or more bangles apertured to receive the shank of the hook and slidably and rotatably mounted on the body of the hook, said apertures being of sufficient diameter to permit free motion in various directions, and a collar of substantially bead formation slidably mounted on the hook shank between a bangle and the barb of the hook, the bangle being of concavo-convex formation whereby movement of the bangle in any direction will not cause interlocking of the bangle with any portion of the hook.

3. A combination of a fish hook and bangles having concavo-convex formation and apertured for slidable and rotatable mounting on the shank of the hook, the convex sides of the bangles being adjacent and facing each other, and a bead slidably mounted on the shank of the hook between one bangle and the barb of the hook and of sufficient width to prevent a bangle from coming in contact with any portion of the barb of the hook.

HIRAM H. HILDEBRANDT.